United States Patent [19]

Zeigner et al.

[11] 4,263,812
[45] Apr. 28, 1981

[54] FLOW SENSOR

[76] Inventors: Willard L. Zeigner, 249 Canyon Creek Ct., San Ramon, Calif. 94583; Dwain D. Conley, 208 Mountaire Cir., Clayton, Calif. 94517

[21] Appl. No.: 93,796

[22] Filed: Nov. 13, 1979

Related U.S. Application Data

[63] Continuation-in-part of Ser. No. 923,314, Jul. 10, 1978, abandoned.

[51] Int. Cl.³ .......................... G01F 1/70; G01F 15/02
[52] U.S. Cl. ..................................... 73/861.05; 73/199
[58] Field of Search ............... 73/199, 861.05, 861.32, 73/861.33, 255

[56] References Cited

U.S. PATENT DOCUMENTS

| | | | |
|---|---|---|---|
| 818,566 | 4/1906 | Scotti | 73/255 |
| 4,011,757 | 3/1977 | Baatz | 73/199 |
| 4,118,980 | 10/1978 | Debeaux | 73/861.05 |
| 4,157,660 | 6/1979 | Spacen | 73/861.05 |

FOREIGN PATENT DOCUMENTS 228226 11/1910 Fed. Rep. of Germany ............. 73/199

1209547 10/1970 United Kingdom ..................... 73/255

Primary Examiner—Herbert Goldstein
Attorney, Agent, or Firm—Owen, Wickersham & Erickson

[57] ABSTRACT

A flow sensor particularly adapted to the measurement of fuel flow to internal combustion engines, but not limited thereto, the sensor including an annular raceway intersected by a tangentially disposed inlet jet nozzle and an outlet opening disposed immediately downstream of the inlet jet nozzle and radially offset therefrom whereby the initial fluid jet passes the outlet opening before radial distribution in the raceway, then circles the raceway and discharges into the outlet; the raceway receiving a ball having a density corresponding to the fluid for continuous rotation at a speed corresponding to the speed of the fluid movement in the raceway; the raceway having a traverse optical sensor to detect rotation of the ball; a chamber having a diaphragm exposed to flow through the inlet, the chamber assuming an expanded condition during increased flow and contractable on initial minimum flow to effect momentary supplemental flow to the raceway, and aid in maintaining movement of the counter ball.

6 Claims, 7 Drawing Figures

U.S. Patent  Apr. 28, 1981  4,263,812
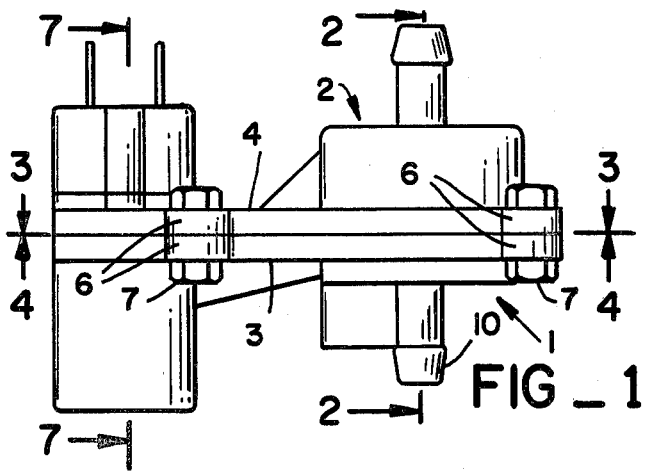
FIG_1
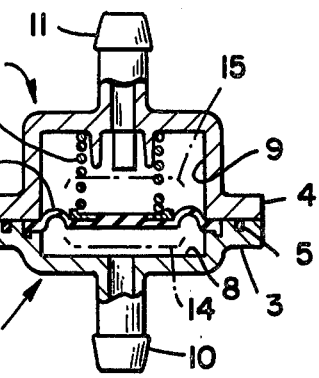
FIG_2
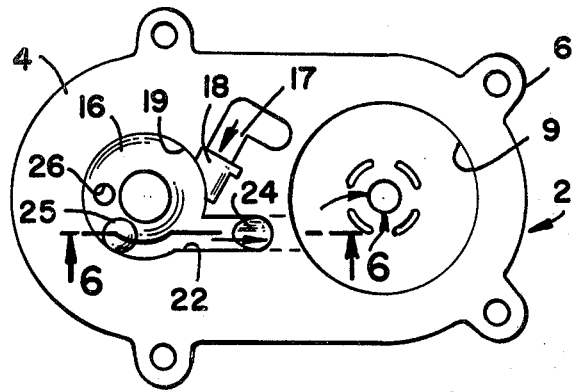
FIG_4
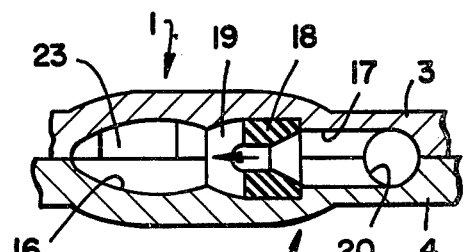
FIG_5
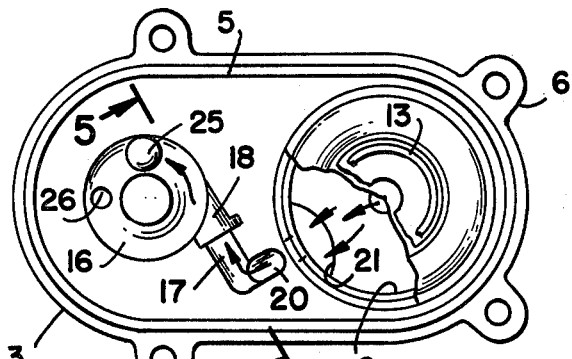
FIG_3
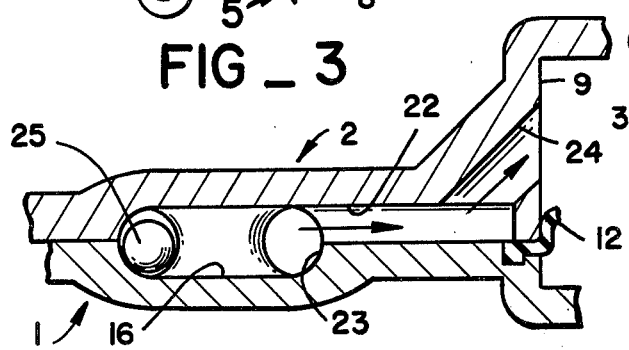
FIG_6
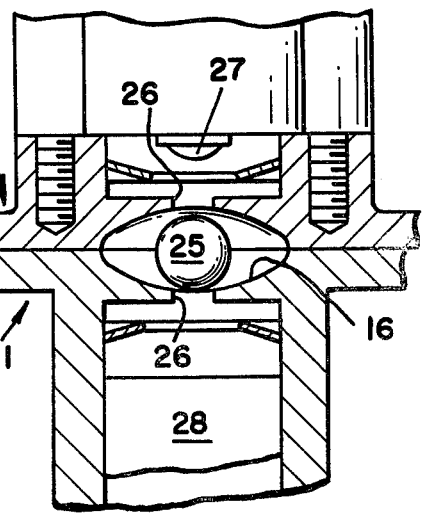
FIG_7

FLOW SENSOR

CROSS-REFERENCE TO RELATED APPLICATION

This application is a continuation-in-part application, Ser. No. 923,314, filed July 10, 1978 now abandoned.

BACKGROUND OF THE INVENTION

This invention relates to a flow sensor particularly adapted to the measurement of fuel flow to internal combustion engines.

The broad concept of a flow sensor utilizing an annular raceway having an inlet, an outlet and a sensing means for recording the rate of rotation of a ball in the raceway has been disclosed in prior patents such as U.S. Pat. Nos. 818,566 and 3,861,210. However, such flow sensors previously known were unable to measure flow rates accurately across the wide range of flow rates, as for example, in automotive engines. That is, such prior flow sensors were relatively accurate at high engine speeds, but were not accurate at engine idle speed. A further problem concerning flow sensors for automotive engines arose due to the uneven fuel pressures of the fuel pump. Such pressure may vary per cycle between 0 and 8 pounds while the engine speed may vary between 500 RPMs and 10,000 RPMs. Heretofore, this caused irregular movement of the ball which contributed to inaccurate flow measurements. Also, with some previous flow sensor devices, the accumulation of trapped air in the raceway also diminished its performance.

It is therefore a general object of the present invention to provide an improved flow sensor that overcomes the problems and deficiencies indicated above.

Another object of the invention is to provide a flow sensor particularly suited to the wide range of operating conditions inherent in automotive engines.

A further object of the invention is to provide a flow sensor including an annular raceway for a counter ball wherein the fuel inlet to the raceway and fuel outlet from the raceway are disposed more than 360° apart so that a continuous rotating force is applied to the counter ball throughout its path in the raceway even though the velocity of the fuel may vary over extreme ranges.

Another object of the invention is to provide a flow sensor with an annular raceway for a counter ball that will allow any air that may enter the raceway to escape through the outlet without being trapped therein and impeding the normal movement of the ball in the fluid stream.

Yet another object of the invention is to provide a flow sensor as indicated in the other objects wherein a variable volume chamber is interposed between the fluid inlet of the sensor and the raceway which under high flow is expanded and under low flow is contracted to provide a momentary source of fluid augmenting the fluid received as low flow is initiated to insure continued movement of the counter ball.

BRIEF SUMMARY OF THE INVENTION

The aforesaid objectives are accomplished by a flow sensor particularly adapted to the measurement of fuel flow to internal combustion engines, but not limited thereto. In accordance with the invention, the sensor comprises a pair of housing elements that form an annular raceway intersected by a tangentially disposed inlet jet nozzle and a closely adjacent outlet opening dispersed immediately downstream of the inlet nozzle. The incoming fluid is forced through the jet nozzle in a primary stream at a relatively high velocity and past the outlet opening and thus it completely circles the raceway while moving to an outer secondary stream and then discharging out of the outlet opening. A counter ball within the raceway constantly moves with the circulating fluid and it is prevented from slowing down or being impeded in any way near the outlet opening by the incoming primary fluid stream from the jet nozzle. The outlet is also constructed so that air bubbles brought into the raceway by incoming fluid can easily escape through the outlet opening. Adjacent the raceway section of the sensor is a chamber housing a diaphragm exposed to the flow through inlet. This chamber assumes an expanded condition during increased flow and is contractable on initial minimum flow to effect momentary supplemental flow to the raceway and thereby further aiding the smooth circular movement of the counter ball. A photo electric cell located at a window on one side of the raceway is provided to sense the passage of the ball on each revolution to provide the necessary signals for flow rate measurement.

Other objects, advantages and features of the invention will become apparent from the following detailed description presented in conjunction with the accompanying drawing.

BRIEF DESCRIPTION OF THE DRAWING

FIG. 1 is a side view of the flow sensor.

FIG. 2 is a transverse sectional view taken through 2—2 of FIG. 1.

FIG. 3 is a plan view of the inlet housing indicated by 3—3 of FIG. 1.

FIG. 4 is a plan view of the outlet housing taken as indicated by 4—4 of FIG. 1.

FIG. 5 is an enlarged fragmentary sectional view showing both housings taken through 5—5 of FIG. 3.

FIG. 6 is an enlarged fragmentary sectional view of both housings taken through 6—6 of FIG. 4.

FIG. 7 is an enlarged fragmentary sectional view taken through 7—7 of FIG. 1.

DETAILED DESCRIPTION OF EMBODIMENT

With reference to the drawing, a flow sensor according to the invention is shown in FIG. 1 in its proper horizontal position for installation in a fluid flow system, such as an engine fuel system. The sensor includes an inlet housing 1 and an outlet housing 2 having confronting plates 3 and 4, one plate having a peripheral seal ring 5. The two plates have peripheral perforated projections 6 joined by screws or bolts 7.

The inlet housing is provided with an inlet chamber 8 and the outlet housing is provided with an outlet chamber 9, the two chambers being disposed in coaxial relation and are provided respectively with coaxial inlet tube 10 and outlet tube 11.

Clamped and sealed between the housing plates is a diaphragm 12. The diaphragm is backed by a spring 13 disposed in the outlet chamber 9 which is substantially deeper than the inlet chamber 8. The diaphragm is axially movable to vary the effective volume of the inlet chamber; that is, the diaphragm is movable between an extended position 14 and a retracted position 15 indicated by broken lines in FIG. 2.

Laterally offset from the chambers 8 and 9 is an annular raceway 16 formed by complementary annular grooves in the inlet and outlet housing plates 3 and 4, as shown in FIGS. 3 and 4. The raceway is circular in cross-section and is intersected by a tangentially extending inlet passage 17 provided with a jet nozzle 18 having at its discharge end a face 19 conforming to the raceway. The jet nozzle is preferably molded from an elastomeric material (e.g., a copolymer of vinylidene fluoride and hexafluoropropylene) and is seated in an appropriate cavity formed in the exit end of the passage 17. This nozzle has a convergent opening which restricts the fluid flow and thus increases its velocity at its exit. The inlet passage 17 communicates with the inlet chamber through a connected passage 20 communicating with a depressed portion 21 of the inlet chamber.

Immediately beyond the jet nozzle 18 with respect to the raceway, the raceway is intersected by an essentially tangentially intersecting outlet passage 22. As shown in FIGS. 5 and 6, this outlet passage 22 is formed in the outlet or top housing 4 at the maximum height of the raceway. This allows any air bubbles that enter the raceway with the fluid (such as air bubbles in gasoline at relatively high temperatures) to readily escape or be forced out by fluid via the outlet passage 22 rather than being trapped in the raceway and thereby interferring with the normal circular movement of a ball therein. The entrance end of the outlet passage is essentially a narrow opening 23 formed by an elongated recess in the outlet housing plate 4 and joined to a connecting passage 24 communicating with the outlet chamber 9. Thus, the opening 23 to the outlet passage 22 is immediately downstream from the jet nozzle 18 of the inlet passage 17. This causes a primary stream of fluid to flow from the jet nozzle at a relatively higher velocity than a surrounding secondary stream resulting from circular flow of fluid already in the raceway. This primary stream flows past the opening 23 with its relatively high flow velocity and it continues flowing for approximately 390° of circular travel from the inlet before leaving the raceway 16 via the outlet opening 23. As shown in FIG. 3, the center line axis of the outlet passage 22 is directed along a tangential line that forms an angle of less than 90° with the center line of the inlet passage 17.

The above described important structural features of the sensor help to assure the consistent, smooth and uninterrupted circular travel of a spherical counter ball 25 in the raceway and especially the travel of the ball past the outlet opening 23, at all rates of fluid flow including unusually low rates. This counter ball has a diameter substantially less than the diameter of the raceway and also a specific gravity approximating the specific gravity of the fluid.

At an appropriate location, the raceway 16 is provided with small opposed windows 26 (See FIG. 7). One of the housings is provided with a small light element 27 exposed to one of the windows while the other housing is provided with a photosensor 28 for receiving light passing through the opposed windows 26.

Operation of the light sensor is as follows:

A typical use of the light sensor is in connection with the measurement of the rate of liquid fuel being supplied to an automotive engine. The engine may vary between an idling speed of a few hundred RPMs to 10,000 RPMs or more. Present day automobiles having small engines may, when idling, use fuel at 0.25 to 0.50 GPH. At normal freeway speed the fuel consumption may be in the order of 2.5 GPH.

Fluid is supplied to the inlet tube 10 and passes therefrom through connecting passage 20 to the inlet passage 17 and jet nozzle 18 causing a jet of fuel to pass by the narrow opening 23 of the outlet passage 22. The incoming fluid jet is the major force in the vicinity of the opening 23 and forces the ball past this opening. Beyond the opening, all the fluid carries the counter ball about the raceway until re-engaged by the jet. Fluid in the region radially outward of the jet is diverted into the narrow opening 23. In effect, the jet is the primary stream while the surrounding stream is the secondary stream. Thus, movement of the counter ball is maintained even under conditions in which the rate of fuel flow is minimal.

During high speed flow of fuel, the fuel entering through the inlet tube 10 depresses the diaphragm to the retracted position indicated by 15. When the engine speed changes rapidly from high speed to idle speed, as idle speed is approached, the diaphragm moves from the retracted position 15 to the extended position 14 introducing momentarily a supplemental quantity of fuel which offsets the sudden change in velocity avoiding irratic movement of the counter ball which may produce a false signal.

Thus, to those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A fluid flow sensor, comprising:
   a. means forming an annular raceway defining a circular axis;
   b. an inlet passage including a nozzle for discharging a primary fluid stream into the raceway essentially tangential to the circular axis of the raceway, the primary stream being surrounded by a secondary stream resulting from circular flow about the raceway;
   c. a race ball received in the raceway and caused to circulate at a rate in proportion to the rate of circular flow of fluid in the raceway;
   d. an outlet passage immediately downstream from said inlet nozzle and having an exit aperture radially outwardly spaced from the primary stream on the outer wall of said raceway for receiving a portion of the secondary stream corresponding in volume to the primary fluid stream, said outlet passage having a center line that extends outwardly from said raceway and forms an angle of less than 90° with the center line of said inlet passage, whereby said nozzle producing said primary stream causes said race ball to move past said exit aperature of said outlet passage without interference, thereby assuring its smooth, continuous, circular travel in said raceway;
   e. and means for detecting rotation of the race ball in the raceway.

2. The flow sensor as described in claim 1 wherein said exit aperture of said outlet passage is in the upper portion of the outer wall of said raceway so that air entering said raceway can readily escape with the fluid through said outlet passage.

3. The flow sensor as described in claim 1 including an intake chamber interposed in said inlet passage; an outlet chamber interposed in said outlet passage; said inlet and outlet chambers being joined; and a diaphragm interposed between said chambers and capable of axial movement to change the volume of said intake chamber between an expanded condition during high speed flow of fluid therethrough and a retracted condition during low speed flow of fluid therethrough, the fluid contained in the expanded chamber momentarily augmenting the fluid discharging into the raceway as flow speed is reduced to low speed flow.

4. A fluid flow sensor, comprising:
 a. a pair of complementary upper and lower housing members forming therebetween an annular raceway, a pair of mutually confronting chambers with an inlet to one of the chambers and an outlet from the other chamber;
 b. said pair of housing members also defining an inlet passage from the inlet chamber to the raceway terminating in a divergent nozzle discharging tangentially into the raceway, and an outlet passage having an entrance aperture from the raceway;
 c. said entrance aperature being disposed immediately downstream from said inlet nozzle with respect to the direction of rotation of the fluid in the raceway and said outlet passage having a center line that extends outwardly from said raceway and forms an angle of less than 90° with a center line of said inlet passage;
 d. a counter ball rotatable in the raceway past said entrance aperture of the outlet passage in response to flow from said nozzle;
 e. means for counting rotation of the counter ball;
 f. a diaphragm interposed between the chambers;
 g. yieldable means in the outlet chamber urging the diaphragm into the inlet chamber reducing the volume thereof, the diaphragm being movable in response to increase of fluid pressure in the inlet chamber to increase the volume of fluid in the inlet chamber;
 h. the diaphragm being responsive to drop in fluid pressure, to discharge fluid momentarily into the inlet passage thereby to supplement fluid entering the raceway.

5. The flow sensor as described in claim 4 wherein said outlet passage and its said entrance aperture are both in said upper housing member so that any air entering said raceway can readily escape through said outlet without impeding the travel of said counter ball.

6. The flow sensor as described in claim 4 wherein said housing members are cast from rigid material and said nozzle is made from an elastomeric material and is retained between said housing members at the exit end of said inlet passage.

* * * * *